ID="19"] United States Patent
Lakdawala

[11] 4,386,771
[45] Jun. 7, 1983

[54] METHOD OF REMOVING A SHEET FROM A DRUM

[75] Inventor: Kushkumar N. Lakdawala, Plano, Tex.

[73] Assignee: Xerox Corporation, Stamford, Conn.

[21] Appl. No.: 261,443

[22] Filed: May 8, 1981

[51] Int. Cl.³ .......................................... B65H 29/06
[52] U.S. Cl. .................................... 271/82; 271/277; 271/3; 346/138
[58] Field of Search ...................... 271/277, 82, D9, 3, 271/221; 346/138

[56] References Cited

U.S. PATENT DOCUMENTS

| | | | |
|---|---|---|---|
| 1,260,017 | 3/1918 | Novotny et al. | 271/221 |
| 2,431,360 | 11/1947 | Philpott | 346/138 |
| 3,618,123 | 11/1971 | Buddendeck | 346/138 |
| 3,790,159 | 2/1974 | Hatzmann et al. | 271/4 |
| 3,808,603 | 4/1974 | Degreve et al. | 346/138 |
| 3,854,715 | 12/1974 | Coleman | 271/277 |
| 4,259,695 | 3/1981 | Nakano | 346/138 |

Primary Examiner—Robert B. Reeves
Assistant Examiner—James Barlow
Attorney, Agent, or Firm—Richard A. Tomlin

[57] ABSTRACT

A facsimile transceiver unit utilizing a drum wherein a drum gripper bar grips an edge of a sheet to be scanned during system operation. On termination of operation, the drum direction is reversed allowing the beam strength of the scanned sheet to lift the free edge of the sheet off the drum. The sheet is then picked off by a suitable member and directed out of the facsimile transceiver unit. At the same time, the gripper bar is opened releasing the sheet for easy operator removal. In a preferred method, the sheet is bumped by the raised gripper bar to ensure release of the sheet from the facsimile transceiver unit.

1 Claim, 11 Drawing Figures

METHOD OF REMOVING A SHEET FROM A DRUM

This invention relates to an improved method for loading and unloading sheet material from a facsimile transceiver unit.

In a facsimile transceiver unit utilizing a drum for conveying sheet material past a scanning station, a gripper bar that rotates with the drum is conventionally used for holding the sheet material to the drum. This gripper bar is normally biased toward the drum and is raised away from the drum by a cam surface when it is desired to either remove a sheet from the drum or place a sheet in contact with the drum. Such an arrangement is used, for example, in the Xerox Telecopier 400 facsimile transceiver. As can be seen by reading the operator instruction manual that accompanies that unit, to load a sheet onto the drum, it is necessary for the operator to open the drum door and rotate the drum by pushing rubber thumb wheels toward the rear of the unit until the drum gripper bar is locked in the topmost position; the paper is then aligned with its edge under the gripper bar, and the drum door closed to complete the loading. To remove the sheet after the unit is shut down, it is necessary for the operator to fully open the drum door, rotate the drum by pushing the rubber thumb wheels until the gripper bar is locked open in its topmost position and pulling the sheet out. It is the purpose of the present invention to make the loading and unloading of sheets to be scanned by a facsimile transceiver unit easier for the operator.

The invention as claimed is intended to provide a method for loading sheets onto and removing sheets from a facsimile transceiver unit conveniently. The advantages offered by the invention are that the operator need only feed the sheet through an inlet port, and after processing is complete, receive the sheet from an outlet port. The facsimile transceiver unit itself provides the remaining necessary sheet handling for facsimile transceiver processing operation.

One way of carrying out the invention is described in detail below with reference to the drawing, which illustrates only one specific embodiment, in which.

Figure 1A:
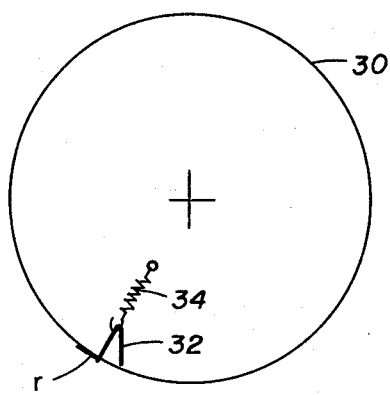
FIGS. 1A-1I depict illustrative apparatus showing the relationship between the sheet being scanned, the gripper bar, drum location and cam interaction of the instant invention.

Referring now to FIG. 1A, there is shown drum 30, gripper bar 32 and gripper bar biasing member spring 34. Conventionally, a single gripper bar 32, which runs the length of drum 30 having springs 34 at either end, is used. Other arrangements using a plurality of shorter bars 32 and springs 34 associated therewith may, of course, be utilized where desired. For convenience, spring 34, which biases gripper bar 32 to the closed position as is shown in FIG. 1A, is shown in FIG. 1 only. FIG. 1A represents the "machine off" position with drum 30, hence gripper bar 32 in a random position indicated as r.

Figure 1B:
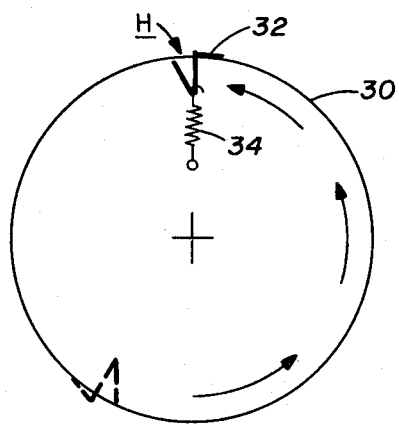

Referring now to FIG. 1B, when the machine is turned on, the drum 30 rotates counterclockwise as shown in FIG. 1B, moving the gripper bar 32 from the random position r (shown in broken line) to the position H or home position represented in the Figures as being the top or 12 o'clock position. Drum 30 movement is accomplished by a motor and motor control means (not shown), which drive driven drum drive shaft 36 (see FIG. 2). The positioning of the drum 30 may be accomplished by any of the known mechanisms for arresting the rotation of a rotating body at a specific location, such as shaft angle encoding, sliding switch contact, optical sensing or the like. The movement of the drum 30 causing the movement of gripper bar 32, which is carried thereon from random position r to home position H, "cocks" the drum 30 into its starting position.

Figure 1C:
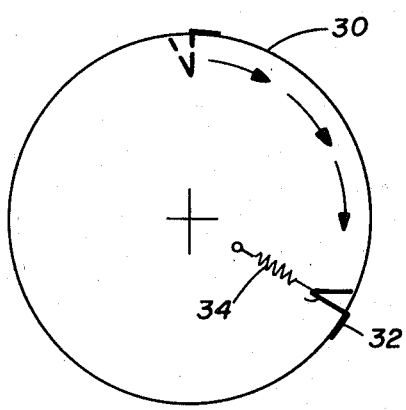
Figure 1D:
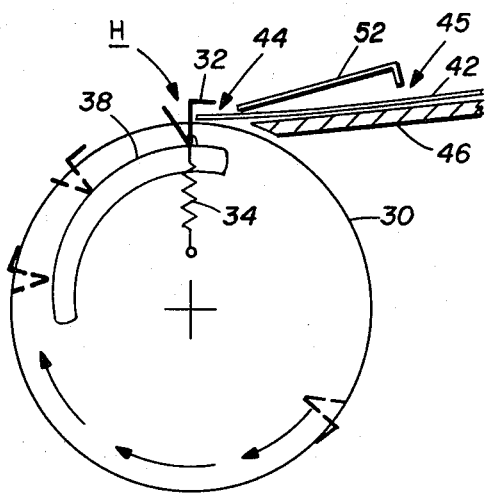

Referring now to FIGS. 1C and 1D, drum 30 is immediately rotated clockwise. As drum 30 continues to rotate in the clockwise direction, and before gripper bar 32 approaches the 9 o'clock position as shown in the Figures, cam surface 38 is moved into gripper bar 32 contact position by activation of gripper bar position solenoid 40 (see FIG. 2). As drum 30 rotates, gripper bar 32 is raised by cam surface 38 against the bias of spring 34 to the open position at home position H. A ready light on the machine tells the operator that the facsimile transceiver is now ready to receive a sheet 42 to be scanned. The operator hand-inserts the sheet 42 into the gripper bar opening 44, through inlet port 45, guided by tray 46 shown in FIG. 1D, and pushes a "transmit" or "receive" button.

Figure 1E:
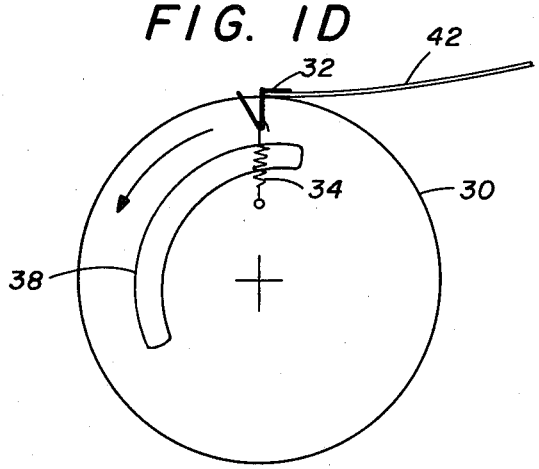
Figure 1F:
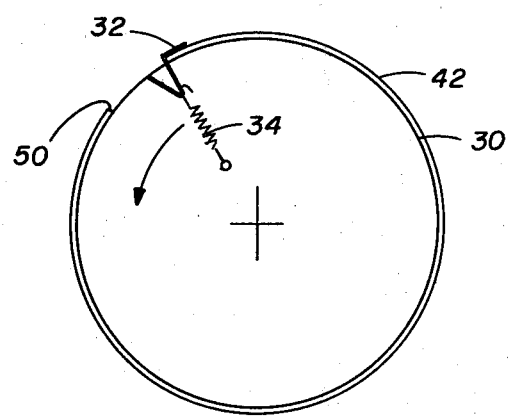

Referring now to FIG. 1E, on operator command to transmit or receive, gripper bar position solenoid 40 (see FIG. 2) is deactivated allowing spring 34 to close gripper bar opening 44, trapping sheet 42 between gripper bar 32 and drum 30. Drum 30 is then rotated counterclockwise as shown in FIG. 1E, wrapping sheet 42 onto drum 30 as shown in FIG. 1F. The sheet is maintained in proximity with the drum surface by means of a series of circumferentially spaced guides 48 (see FIG. 2) during scanning. These guides may be in the form of longitudinally extending plastic or like material members spaced from the drum by a sufficient clearance to maintain sheet 42 thereon.

The processing operation may employ the use of a scanning head (not shown) for reading sheet 42 where it is a document to be transmitted, in which case the scanning head could be an optical sensor moving in a direction parallel to the long axis of the drum or an array of stationary sensors, which would eliminate the need for a moving head. Similarly, printing means, such as a moving head electrographic printer, used, for example, in the Xerox Telecopier 400 facsimile transceiver, or an array of stationary thermal printers, such as used in the Xerox Telecopier 485 facsimile transceiver, could be utilized. Examples of the operation of scanning and marking devices employed in conjunction with facsimile transmission can be found in U.S. Pat. No. 3,432,613 to Saeger et al and U.S. Pat. No. 3,598,910 to Johnson. Conventional transmission utilizes optic generation and reflection, and printing utilizes selectively actuated marking devices. For receiving, sheet 42 could be treated with, for example, a heat sensitive material or be plain paper depending on the marking technology used. During all of the processing steps, the drum is rotating counterclockwise, as shown in the Figures, with the gripped edge under gripper bar 32 being the leading edge of sheet 42.

Figure 1G:
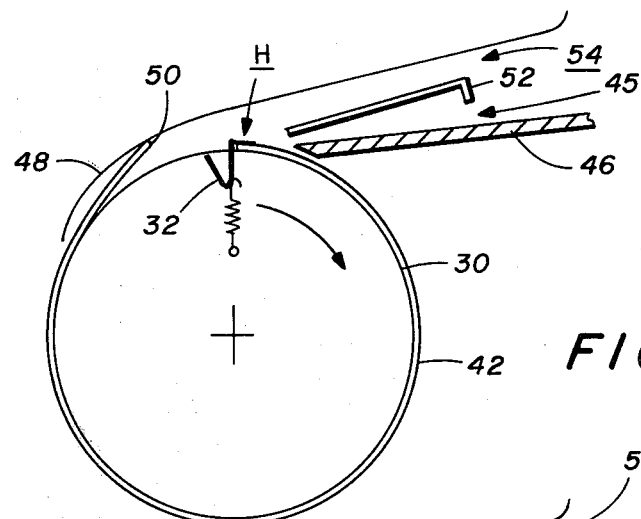

Referring now to FIG. 1G, after processing is complete, drum 30 is stopped with the gripper bar 32 in the home position H. Starting with the gripper bar 32 in the home position, the drum is rotated clockwise, which allows the free edge 50 of sheet 42, which now is the leading edge, to lift off the surface of drum 30 by the beam strength of sheet 42. By free edge 50 is meant the edge of sheet 42 directly opposite the gripped edge. For this system to work efficiently, it is necessary for sheet 42 to be made of a material having sufficient beam strength to lift edge 50 high enough to be picked off the drum as shown in FIG. 1H.

Figure 1H:
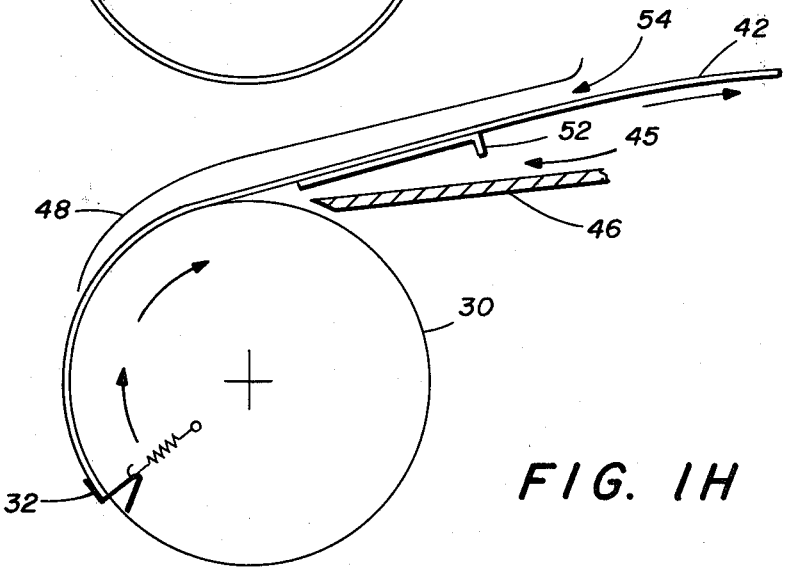

Referring now to FIG. 1H, as drum 30 continues to rotate in a clockwise direction as shown in the Figures, sheet stripper 52, strips sheet 42 from drum 30 and directs it through sheet outlet port generally designated 54.

Figure 1I:
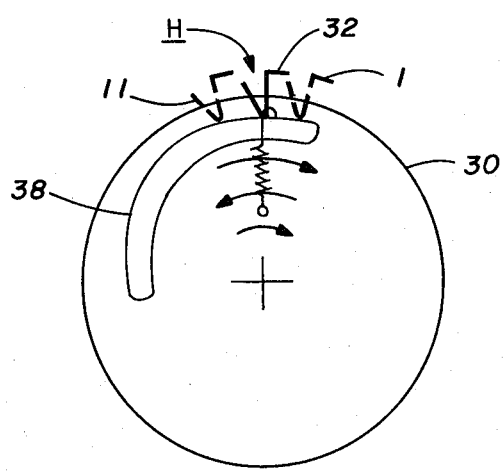

Referring now to FIG. 1I, as the gripper bar 32 advances clockwise, cam surface 38 is again brought into contact position when the gripper bar 32 approaches the 9 o'clock position, raising gripper bar 32 to the open position. The drum 30 is rotated with gripper bar 32 in the open position to the position of the broken line gripper bar 1 shown in FIG. 1I, which corresponds roughly to the 1 o'clock position to release sheet 42. The drum 30 is immediately moved counterclockwise so that gripper bar 32 is in the position represented by broken line 11 and then again immediately forward to the H position to ensure sheet 42 release. The movement of the gripper bar 32 from 1 to 11 and back to H is referred to herein as "bumping" and its purpose is to ensure complete release of sheet 42.

Figure 2A:
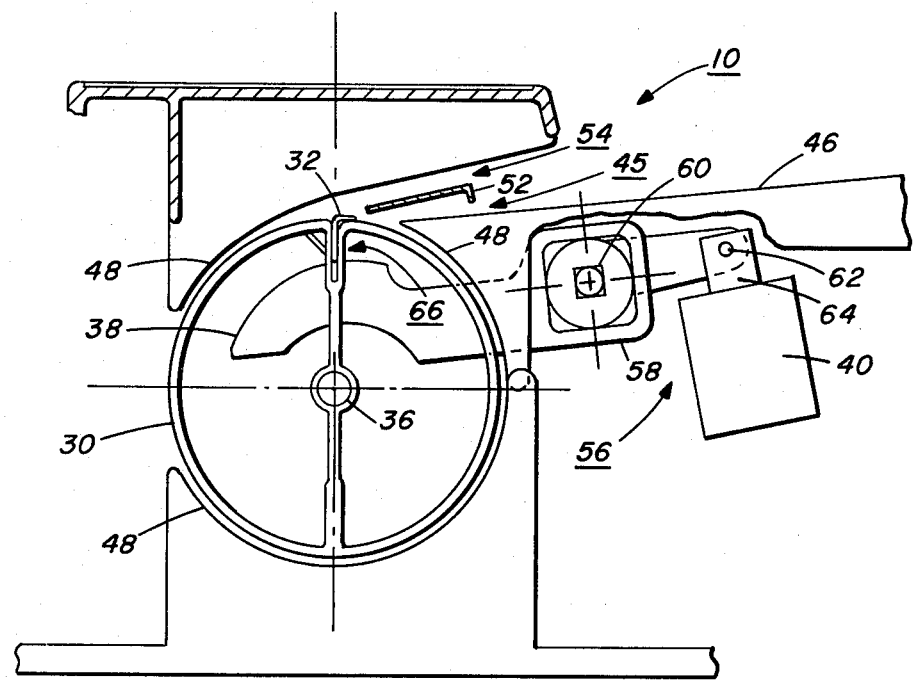
FIGS. 2A and 2B show partially cut away the details of a typical camming device in accordance with the present invention.

Referring now to FIG. 2A, there is shown in partial cross-section a facsimile transceiver, generally designated 10, including a typical cam device, generally designated 56, for opening the gripper bar 32. The cam device includes cam surface 38 carried by cam surface support beam 58 mounted for rotation on cam surface support beam shaft 60. Connected to the cam surface support beam 58 is pin 62. Solenoid rod 64 is rotatably connected to pin 62 and is acted on by solenoid 40.

Figure 2B:
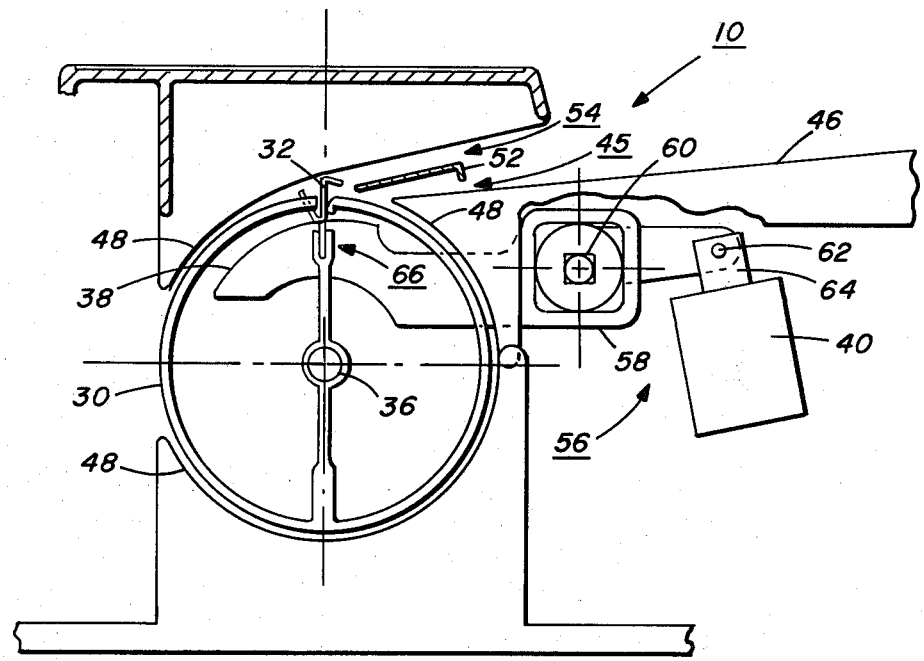

Referring now to FIG. 2B, in operation when it is desired to load a sheet 42 into the facsimile transceiver 10 or remove a sheet 42, solenoid 40 is activated pulling solenoid rod 64 down, which, through the action of pin 62, causes cam surface support beam 58 to rotate in a clockwise direction as shown in FIG. 2B. This rotation of cam surface support beam 58 causes cam surface 38 to contact gripper bar 32, thus opening the gripper bar 32. A guide means 66 machined into the drum 30 is provided to hold the gripper bar in place within the drum.

It can be seen that the provision of the various operating steps of the present invention provides an improved, simplified interface between the facsimile transceiver and the operator.

While this invention has been particularly shown and described with reference to an exemplary embodiment thereof, it will be obvious to those skilled in the art that the foregoing examples as well as suggested alternatives as well as other changes and modifications in form and detail may be made without departing from the scope and spirit of the appended claims.

What is claimed is:

1. The method of removing a sheet from the drum of a facsimile transceiver device, which facsimile transceiver device processes a sheet attached to said drum while said drum is rotating in a first direction in which the leading edge of said sheet is gripped by a gripper bar, which comprises:

stopping said drum;

reversing the direction of rotation of said drum so that the free edge of said sheet becomes the leading edge of said sheet and allowing the beam strength of said sheet to raise said free edge of said sheet from said drum while simultaneously stripping said sheet from said drum and opening said gripper bar to release said sheet, said reverse direction rotation continuing until said gripper bar passes a home position;

stopping said drum;

rotating said drum again in said first direction until said gripper bar passes said home position;

stopping said drum;

reversing the rotation of said drum; and stopping said drum when said gripper bar is in said home position.

* * * * *